United States Patent
Chen et al.

(10) Patent No.: US 9,418,310 B1
(45) Date of Patent: Aug. 16, 2016

(54) ASSESSING LEGIBILITY OF IMAGES

(75) Inventors: Hong Chen, Bellevue, WA (US); Ming Zhao, Bellevue, WA (US); Junqing Shang, Seattle, WA (US); Michael Patrick Bacus, Seattle, WA (US); Sherif M. Yacoub, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 412 days.

(21) Appl. No.: 13/529,834

(22) Filed: Jun. 21, 2012

(51) Int. Cl.
*G06K 9/46* (2006.01)
*G06K 9/66* (2006.01)
*G06K 9/00* (2006.01)

(52) U.S. Cl.
CPC .......... *G06K 9/4638* (2013.01); *G06K 9/00442* (2013.01); *G06K 2209/00* (2013.01)

(58) Field of Classification Search
None
See application file for complete search history.

(56) References Cited

U.S. PATENT DOCUMENTS

| | | | | |
|---|---|---|---|---|
| 6,909,805 B2* | 6/2005 | Ma et al. | | 382/170 |
| 6,941,013 B1* | 9/2005 | Drayer | | 382/168 |
| 7,616,814 B2* | 11/2009 | Wolf et al. | | 382/176 |
| 7,778,489 B1* | 8/2010 | Siegel et al. | | 382/286 |
| 8,103,104 B2* | 1/2012 | Fan | | 382/199 |
| 2010/0253702 A1* | 10/2010 | Gotoh | | 345/660 |
| 2013/0002814 A1* | 1/2013 | Park et al. | | 348/43 |

* cited by examiner

*Primary Examiner* — Vikkram Bali
(74) *Attorney, Agent, or Firm* — Lee & Hayes, PLLC (57) ABSTRACT

In some implementations, legibility of an image may be automatically determined based, at least in part, on text contained in the image. For example, image analysis techniques may be used to identify text components in an image. One or more features of each text component may be determined for use in assessing the legibility of the text component. For example, a classifier trained on the one or more features may provide a confidence level indicative of the legibility of each text component. The confidence level for each of the text components may be compared to a legibility threshold for determining whether the text component is legible or illegible. Based, at least in part, on the determination as to how much of the text in the image is legible or illegible, an overall legibility of the image may be assessed.

27 Claims, 7 Drawing Sheets

ASSESSING LEGIBILITY OF IMAGES

BACKGROUND

The continued proliferation of digital content items has led to an increase in the availability of such content items, as well as an increase in the availability of electronic devices and applications used for consuming these content items. For instance, users consume content items, such as electronic books (eBooks), digital videos, digital songs, and the like, on an assortment of electronic devices. Furthermore, these content items may often include images, or may have images associated with them, that will be viewed on various different types of electronic devices having various different form factors and display properties.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure includes techniques and arrangements for assessing legibility of an image, such as may be included with a digital content item (hereafter "content item"). For example, numerous types of images included with content items may include text in the image, such as in the case of a book cover that includes a book title and author's name, maps, tables, graphs, charts, informational graphics, and so forth. Further, content items to be rendered on electronic devices are typically published using a variety of different formats, which may cause publishers and authors to add textual captions for images directly into the image, rather than attempting to place the image caption adjacent to the image in the text of the content item.

In addition, when images are published in electronic formats, such as for inclusion with a content item, the images may be downsized to fit within a smaller form factor than the form factor for which the image was originally intended. When an image is downsized too much, important information in the image may become illegible. Picture information is often more robust to downsizing, while textual information may sometimes become illegible with only a small amount of downsizing. For example, in the case of a photograph or drawing, a user may still be able to comprehend the content of the photograph or drawing even after significant downsizing. On the other hand, in the case of an image that includes a large amount of text, such as a table, a graph, a chart, or the like, the image may be virtually useless to the user if the text of the image is not legible.

In addition, in the electronic publishing industry, a content provider may receive, and make available to consumers, hundreds of thousands of content items. Many of these content items may include images, which may or may not be legible. Accordingly, implementations herein include a technique for automatically assessing the legibility of an image, such as may be included in a content item. For instance, an assessment of an overall legibility of an image may be based at least in part on a determination of the legibility of any text included in the image. Thus, as one example, the image may be examined and analyzed to identify any text that may be contained in the image. Furthermore, if the image does contain text then the legibility of the text in the image may be assessed. Based at least in part on the assessment of the legibility of the text in the image, an overall legibility of the image may be determined.

In some examples, connected component analysis and one or more trained classifiers may be employed for carrying out the techniques described herein. For example, connected component analysis or other types of image analysis, such as segmentation, edge detection, feature extraction, or the like, may be applied to identify various connected components of an image. Additionally, a first classifier may be trained for discerning text components in the image from other components in the image based, at least in part, on one or more features determined for each connected component identified in the image. Further, a second classifier may be trained for determining the legibility of the text identified in the image based, at least in part, on one or more features determined for each textual component identified in the image. In addition, a third classifier may be trained for determining an overall legibility of the image based, at least in part, on one or more features determined for the image. Thus, in some cases, the arrangements and techniques herein may provide an indication of legibility or illegibility for an image based on a confidence level determined for the image.

For discussion purposes, some example implementations are described in the environment of determining legibility of an image included with a content item, such as an eBook. However, the implementations herein are not limited to the particular examples provided, and may be extended to determining the legibility of any types of images, whether associated with other types of content items, such as video or audio recordings, or whether the image is independent of any other content item.

Example Framework

Figure 1:
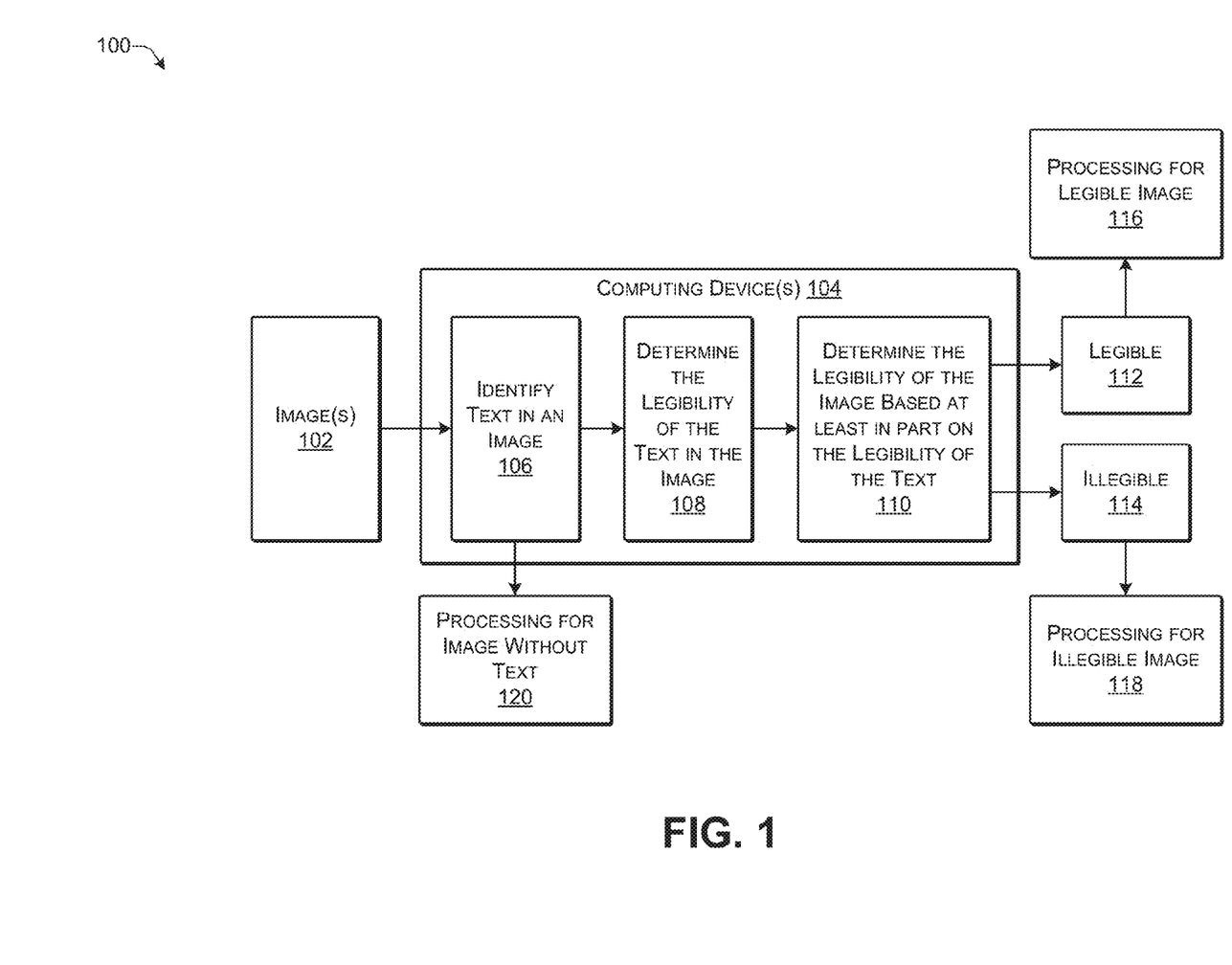
FIG. 1 illustrates an example framework for assessing the legibility of an image according to some implementations.

FIG. 1 illustrates an example framework 100 for assessing legibility of one or more images 102 according to some implementations. Portions of the framework 100 may be executed by one or more computing devices 104, such as one or more computing devices of a content provider or other entity evaluating the legibility of the image 102. Accordingly, implementations herein are not limited to any particular source or use for the images 102 to be assessed. In some examples, the framework 100 may be used to automatically determine the legibility of the image 102, such as without human intervention. Further, the images discussed herein may be in any suitable electronic image format, such as TIFF (Tagged Image File Format), JPEG (Joint Photographic Experts Group), BMP (Bitmap), GIF (Graphics Interchange Format), PNG (Portable Network Graphics), Exif (Exchangeable image file format), RAW, and so forth. Thus, the disclosure herein is not limited by the image file format.

At 106, the computing device 104 may access, obtain, or otherwise receive the image 102 to identify text in the image 102. For instance, the computing device 104 may employ a suitable technique for distinguishing any text contained in the image from other components included in the image. As one example, the computing device 104 may use a connected component analysis or labeling technique to scan the image and identify any connected components in the image. The computing device 104 may further employ a classification technique or other computer vision techniques to distinguish text components from other components in the image by evaluating features such as relative component size and positioning, Haar wavelet coefficient features, and so forth. In some implementations, the images 102 may be first be categorized into two or more categories of image types. As one example, the images 102 may initially be categorized as either photographs or lineart images, such as by using a classifier that distinguishes between histograms of original and gradient images. For example, for photos, the colors are typically spread across a color space while, for lineart images, the colors are typically distributed in more narrow bands. Thus, by creating one or more histograms for each image, a classifier may be used to distinguish the images into either photographs or lineart images. Further, lineart images are typically more likely to contain text embedded in the image. Accordingly, based on the initial classification of the image as a photo or lineart, different probabilities may be applied during subsequent processing at 106 when determining whether an image contains text. In addition, while two types of categories are discussed above, numerous other types of categories may be employed, or alternatively, in other examples, no initial categorization may be employed.

At 108, the computing device 104 may determine the legibility of any text identified in the image 102. For example, the computing device may evaluate one or more features of the text identified in the image to estimate a legibility of the text. The computing device may take into consideration features that indicate the convexity of the characters of the text, portions of holes in the characters, and various other features of the text when assessing the legibility of the text.

At 110, the computing device 104 may determine the overall legibility of the image 102 based, at least in part, on the legibility of the text identified in the image. As one example, the computing device 104 may compare the total number of text characters identified in the image to the number of text characters that have been determined to be illegible to predict, at least in part, the overall legibility or illegibility of the image 102. Accordingly, the computing device may determine a result for the image 102 within a confidence level, which may be either that the image is legible 112 or illegible 114. In the case that the computing device 104 determines that the image is legible 112, processing 116 for a legible image may be performed by the one or more computing devices 104, or by one or more other computing devices (not shown in FIG. 1). For example, the computing device 104 may provide an indication that the image 102 is legible to another computing device, to a metadata file associated with the image 102, or the like. Alternatively, the computing device 104 may simply add the image 102 and/or a content item containing or associated with the image 102 to a content item library, content item catalog, or the like.

On the other hand, if the computing device 104 determines that the image 102 is illegible 114, the computing device 104 or one or more different computing devices (not show in FIG. 1) may perform processing 118 for an illegible image. The processing 118 for an image 102 determined to be illegible may include flagging the image 102 and/or forwarding the image 102 to a computing device of a human reviewer (not shown in FIG. 1) to enable the human reviewer to verify the assessment of illegibility made by the computing device 104. Additionally, or alternatively, a publisher or author of a content item that includes or is associated with the image 102 may be notified that the image 102 has been determined to be illegible. In some cases, such a content item might not be distributed or made available to consumers until a replacement image has been provided.

Furthermore, it may be noted that, in some cases, an image 102 may not include any identifiable text in the image. In that event, processing 120 for an image without text may be performed by the computing device 104 or by the one or more different computing devices. For example, as mentioned above, images without text may be downsized considerably more than images with text, while retaining legibility. Accordingly, in some examples, processing 120 for an image 102 that is determined to be without text may be similar to the processing 116 discussed above for an image 102 that has been determined to be legible.

Example Image

Figure 2:
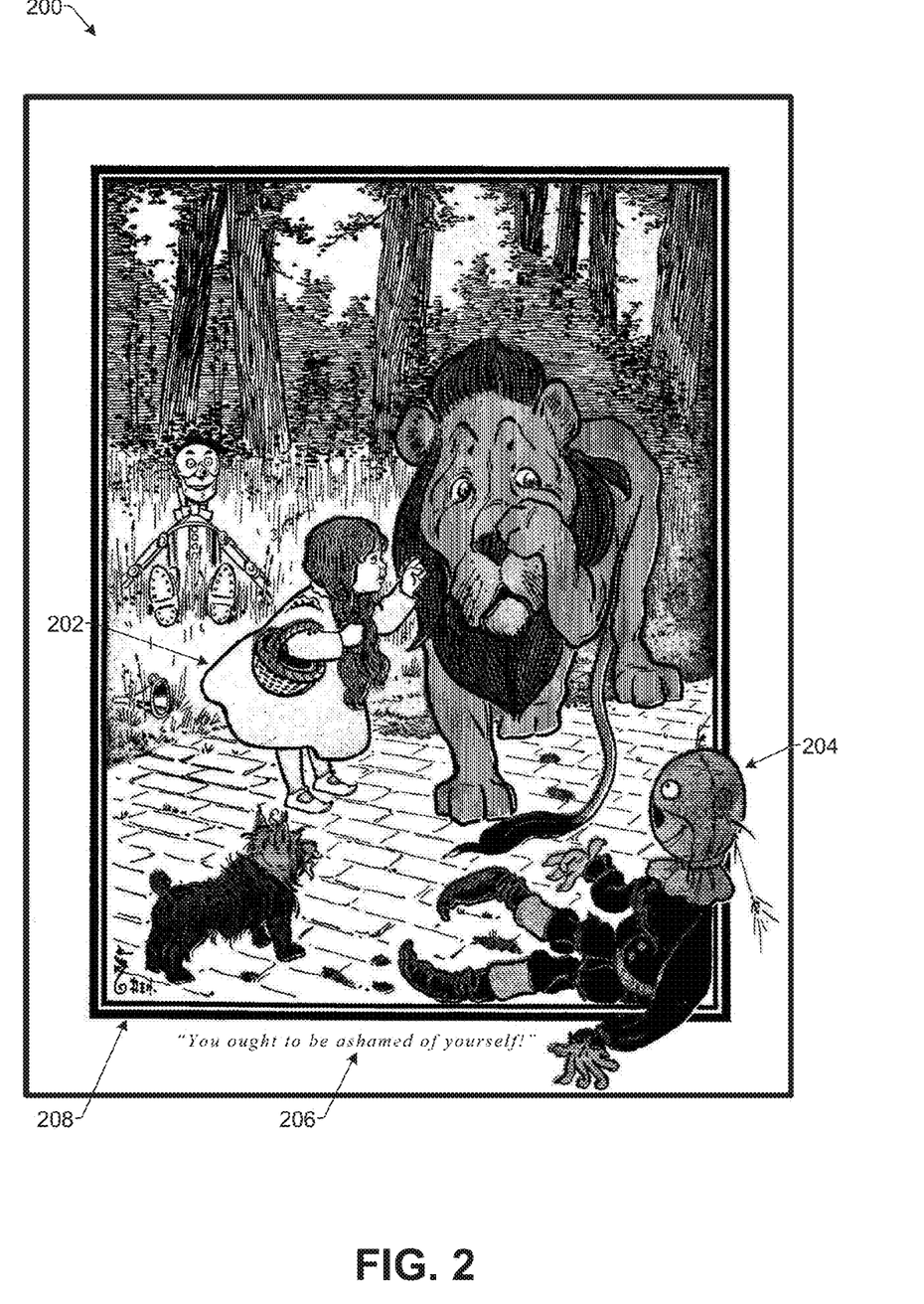
FIG. 2 is an example image including text content according to some implementations.

FIG. 2 illustrates an example of an image 200 including text in the image according to some implementations. The image 200 depicts a plurality of image components, such as a girl 202, a scarecrow 204, and so forth. The image 200 further includes characters of text 206, namely a caption that reads, "You ought to be ashamed of yourself!" The image 200 further includes additional characters of text 208, which may be the signature of the artist that created the image 200.

As discussed above, various computer vision techniques may be used to detect the text included in the image 200 to assess the legibility of the text, such as text portions 206, 208. As one example, connected component analysis (also referred to as connected component labeling) may be used for identifying the various components of the image 200. For instance, connected component analysis may be applied to identify subsets of connected components in the image 200 based on a given heuristic by scanning the image 200 and grouping the pixels of the image into components based on pixel connectivity. As one example, a connectedness or connectivity between a particular pixel and its neighboring pixels may be established by comparing a value of a pixel property for the particular pixel with values of the pixel property held by neighboring pixels to determine whether the particular pixel and its neighbors share (e.g., within a threshold amount or threshold range) a value for the pixel property. In other words, the pixels in a particular connected component may be connected by sharing similar pixel intensity values, or may share other pixel properties, such as color or texture, within a threshold range of values for the pixel property. On the other hand, other adjacent regions of pixels may be significantly different with respect to the particular pixel propert(ies), e.g., outside of the threshold range, and therefore would not be included in the particular connected component. Thus, the pixels in a connected component may be connected with one another by sharing a similar value for at least one pixel property.

The analysis of the image 200 may be performed to identify groups of connected pixels and then each pixel may be labeled according to the component to which it is assigned. For example, typically, the pixels included in a single letter or character of text might be connected as being of similar pixel intensity, or by having some other pixel property in common. Furthermore, extremely large features, extremely small features, and/or extremely irregular components can be filtered out during the connected component analysis, as these components would not normally be text components. For example, text components are generally of a substantially uniform size and, generally, each character will fit within a substantially uniform bounding box.

Accordingly, applying connected component analysis to the image 200 may result in the identification of a plurality of connected components in the image 200. As discussed additionally below, additional techniques may be used to isolate the components corresponding to text 206, 208 from the other components of the image 200. Furthermore, while connected component analysis may be employed in some of the examples herein, other suitable computer vision and image analysis techniques, such as segmentation, edge detection, feature detection, and the like, may be used as an alternative for distinguishing elements of an image and for detecting text in an image, as will be apparent to those of skill in the art having the benefit of the disclosure herein.

Example Architecture

Figure 3:
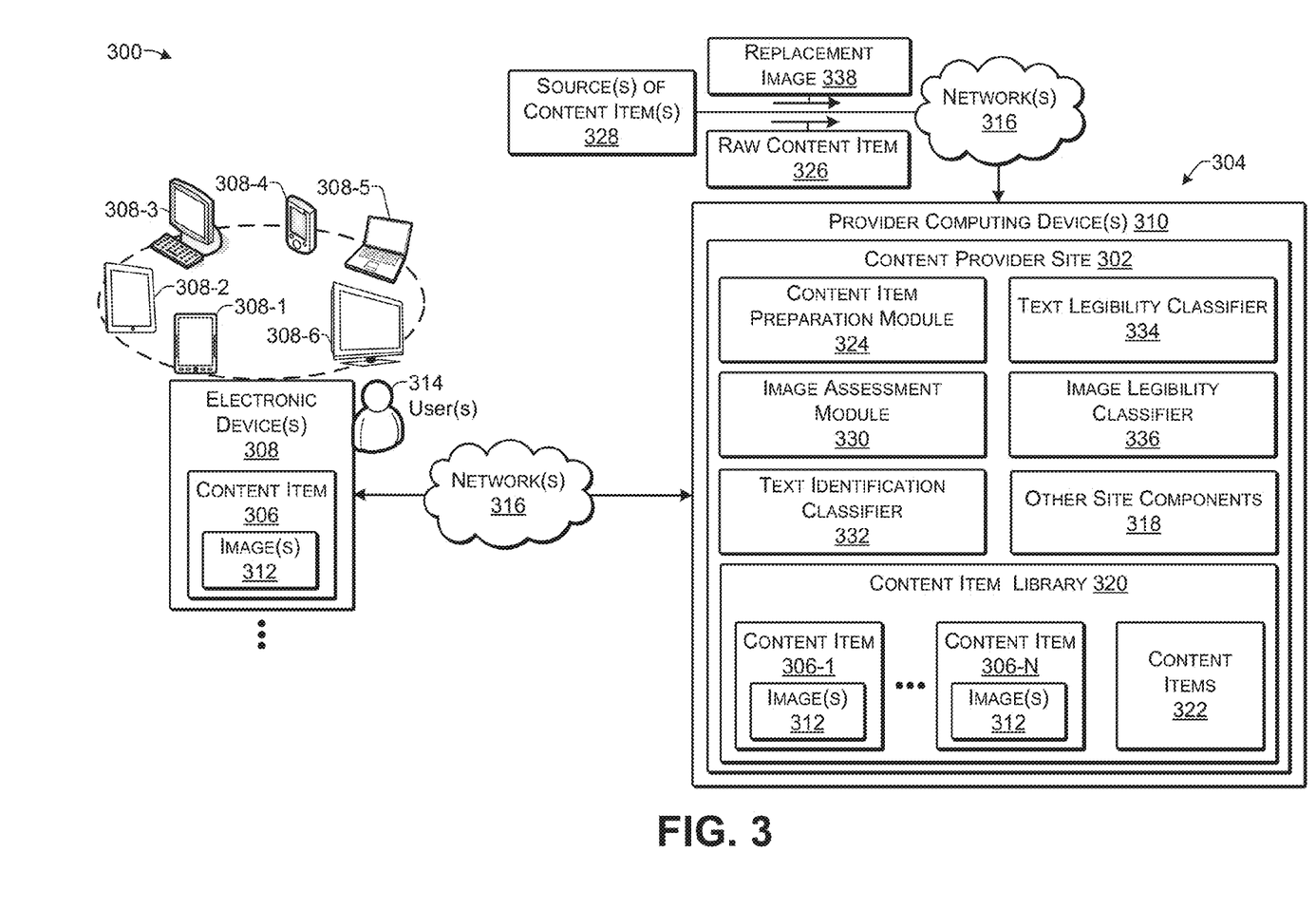
FIG. 3 illustrates an example architecture of a system for assessing the legibility of an image according to some implementations

FIG. 3 illustrates an example architecture of a system 300 including a content provider site 302 of a content provider 304 to provide one or more content items 306 to one or more electronic devices 308 according to some implementations. As one example, the content provider site 302 may be implemented on one or more provider computing devices 310, and may be a merchant website, an e-commerce site, or the like, that offers content items to the public. For instance, the content provider site 302 may offer electronic content items 306, such as electronic books, magazines, newspapers, songs, movies, and so forth, to the public through a website, other type of electronic commerce site, an online location, or the like. In some examples, the content provider site 302 may alternatively, or additionally, provide content items through an online or mobile application executing on the electronic device 308. For example, an application on the electronic device 308 (not shown in FIG. 3) may connect to or obtain content from the content provider site 302 to enable the purchase or management of content items, and the like. Thus, the content provider site 302 may enable the electronic device 308 to access content items 306 through an online or mobile application executing on a mobile device, such as an eBook reader, smart phone, tablet computing device, or the like. Accordingly, the content provider site 302 is not limited to a website accessed by a browser, but may encompass other technologies for providing content items, such as through in-application shopping, and the like.

The content item(s) 306 may include one or more images 312 or may have one or more images 312 associated therewith. In some examples, the content item 306 may be an electronic book (eBook) having one or more pages of text. The electronic device 308 may be able to display the text of the eBook and any illustrations, photographs, tables, maps, charts, graphic elements or other images 312 that might be contained in the eBook. The terms "book" and/or "eBook," as used herein, include electronic or digital representations of printed works, as well as digital content that may include text, multimedia, hypertext, and/or hypermedia. Examples of content items include, but are not limited to, electronic versions of books, magazines, newspapers, periodicals, journals, reference materials, textbooks, anthologies, instruction manuals, proceedings of meetings, forms, directories, web pages, plays, screen plays, closed caption transcripts of movies and television shows, song lyrics, and so forth. Accordingly, the terms "book" and/or "eBook" may include any readable or viewable textual content of a content item that is in electronic or digital form.

Additionally, some implementations herein are not limited to digital text items, but may also include other content items, such as digital audio (e.g., music, audible books, etc.), digital video (e.g., movies, television, short clips, etc.), images (e.g., art, photographs, etc.), and other multi-media content, as described additionally below. For example, a movie may have a movie poster image or other image associated therewith that may include text. Similarly, a song may have album art associated therewith that may include text. Thus, implementations herein are not limited to any particular type of content items 306.

The content provider site 302 is able to communicate with one or more electronic devices 308 and one or more users 314 through one or more networks 316. For example, the network(s) 316 may include a local area network (LAN), a wide area network (WAN), such as the Internet, or any combination thereof, and may include both wired and wireless communication technologies using any suitable protocols and communication techniques. The content provider site 302 and the electronic device 308 may communicate and interact with one another using any combination of suitable communication and networking protocols, such as Internet protocol (IP), transmission control protocol (TCP), hypertext transfer protocol (HTTP), and so forth.

Some examples of the electronic device 308 may include digital media devices and eBook readers 308-1, tablet computing devices 308-2, desktop, terminal and workstation computing devices 308-3, smart phones and mobile devices 308-4, laptop and netbook computing devices 308-5, televisions, gaming systems and home electronic devices 308-6, and any other device capable of accessing and rendering content items, online content, mobile content, or the like. Accordingly, the images 312 included with a content item 306 may be assessed for legibility for viewing on a variety of devices 308.

In some implementations, the content provider site 302 may be hosted on one or more provider computing devices 310. As one example, the provider computing device(s) 310 may be one or more web servers located at a data center, server farm, or other single physical location. In other examples, the content provider site 302 or portions thereof may be located in diverse locations that are physically remote from one another. Further, in some implementations, the content provider site 302 may include a group of websites, data stores, services, and the like, hosted on a plurality of different provider computing devices 310 at a plurality of diverse locations, or hosted by one or more provider computing devices 310 at a single location.

The content provider site 302 may also include various other site components 318, as is known, depending on the design and intended use of the content provider site 302. For example, the other site components 318 may include one or more pages of content, such as webpages, webviews, or other online content, that may be presented to the user 314 through the provider interaction module 312, such as during shopping for content items 306 from the content provider site 302.

The content provider site 302 may include or may access a content item library 320. For example, the content item library 320 may include a plurality of content items 306-1, . . . , 306-N each of which may include one or more images 312. The content item library 320 may further include one or more other content items 322 that do not contain images. Thus, in some cases, the content item library 320 may contain a large number of content items 306, 322 of various types that the content provider 304 has available for access by the user 314, such as by purchase through the content provider site 302.

The content provider site 302 may also include a content item preparation module 324 that may receive raw content items 326 from one or more sources 328 of content items. For example, the sources 328 of content items may be publishers, authors, movie distributors, studios, music companies, artists, and so forth. In the case of textual content items, the content item preparation module 324 may receive a raw content item 326 from the publisher, author, or other source of content items 328, and may parse and process the raw content item 326 to make the content item compatible with various display formats, device platforms, and so forth. For example, the content item preparation module 324 may identify the start location and end location of pages, paragraphs, sentences, and other information in the content item, and may produce metadata for the content item that identifies the content item and the properties of the content item to enable rendering of the content item on an electronic device 308. The content item preparation module 324 may further identify any images contained in a received raw content item 326.

The content provider site 302 may further include an image assessment module 330, which may operate on the received raw content items 326 and/or the content items 306 already contained in the content items library 320 to assess the legibility of any images included in the raw content items 326 or the content items 306-1, . . . , 306-N. For example, the image assessment module 330 may select a particular content item 306 from the content item library 320 for assessing the legibility of any images 312 contained in the particular content item 306. Similarly, in the case of a raw content item 326, the image assessment module 330 may receive an image from the content item preparation module 324 for assessing the legibility of the image. In some examples, the image assessment module 330 may determine the legibility of the image in the manner described above with respect to the framework 100 of FIG. 1 and/or according to the techniques described herein with respect to FIGS. 2 and 4-6.

During assessment of the legibility of a selected image, the image assessment module 330 may employ or may access one or more classifiers such as a text identification classifier 332, a text legibility classifier 334, and/or an image legibility classifier 336. For example, the text identification classifier 332 may be trained by the image assessment module or by a separate training module (not shown in FIG. 3) to identify portions of text in an image following performance of connected component analysis on the image. For instance, the text identification classifier 332 may be trained on a plurality of different features for distinguishing text from other connected components in an image, as discussed additionally below with respect to FIG. 4. Furthermore, the text legibility classifier 334 may be trained by the image assessment module 330 or by a separate training module (not shown in FIG. 3) to assess the legibility of text identified by the text identification classifier 332. For example, the text legibility classifier 334 may be trained on a plurality of different features related to legibility of the text, as discussed additionally below with respect to FIG. 5. In addition, the image legibility classifier 336 may be trained by the image assessment module 330 or by a separate training module (not shown in FIG. 3) to assess the overall legibility of the image based on a plurality of features, including features related to the determination of legibility of the text made by the text legibility classifier 334. Furthermore, while three classifiers are described in this example it will be apparent to those of skill in the art in view of the disclosure herein that more or fewer classifiers may be used in some examples, or alternative image analysis techniques may be employed.

As discussed above with respect to FIG. 1, the images 312 in the content items 306 and/or in the raw content items 326 may be assessed to determine the legibility of the images 312. For example, the image assessment module 330 may execute the framework 100 discussed above with respect to FIG. 1 for determining whether a particular image is legible or illegible. Furthermore, as mentioned above with respect to the processing 118 for an illegible image, the illegible image may be reviewed by a human reviewer to determine the severity of the illegibility. For example, if the illegibility is not severe, or the illegible text components in the image do not significantly impact a user's understanding of the image, such as may be the case when the image is primarily a picture or photograph and the text components are not needed for an understanding of the image, the corresponding content item 306 containing the illegible image may be placed under a soft suppress in which the source 328 of the content item is notified that a replacement image 338 is requested, but the content item 306 may still be made available to the users 314. On the other hand, if the illegible image is primarily a text image such as a table, chart, graph, or the like, and the text is illegible, then the content provider 304 may impose a hard suppress on the content item 306 by preventing the content item from being made available to members of the public, such as users 314. The content provider 304 may wait until the source 328 of the content item provides a replacement image 338 before making the content item available to users 314.

Example Processes

Figure 4:
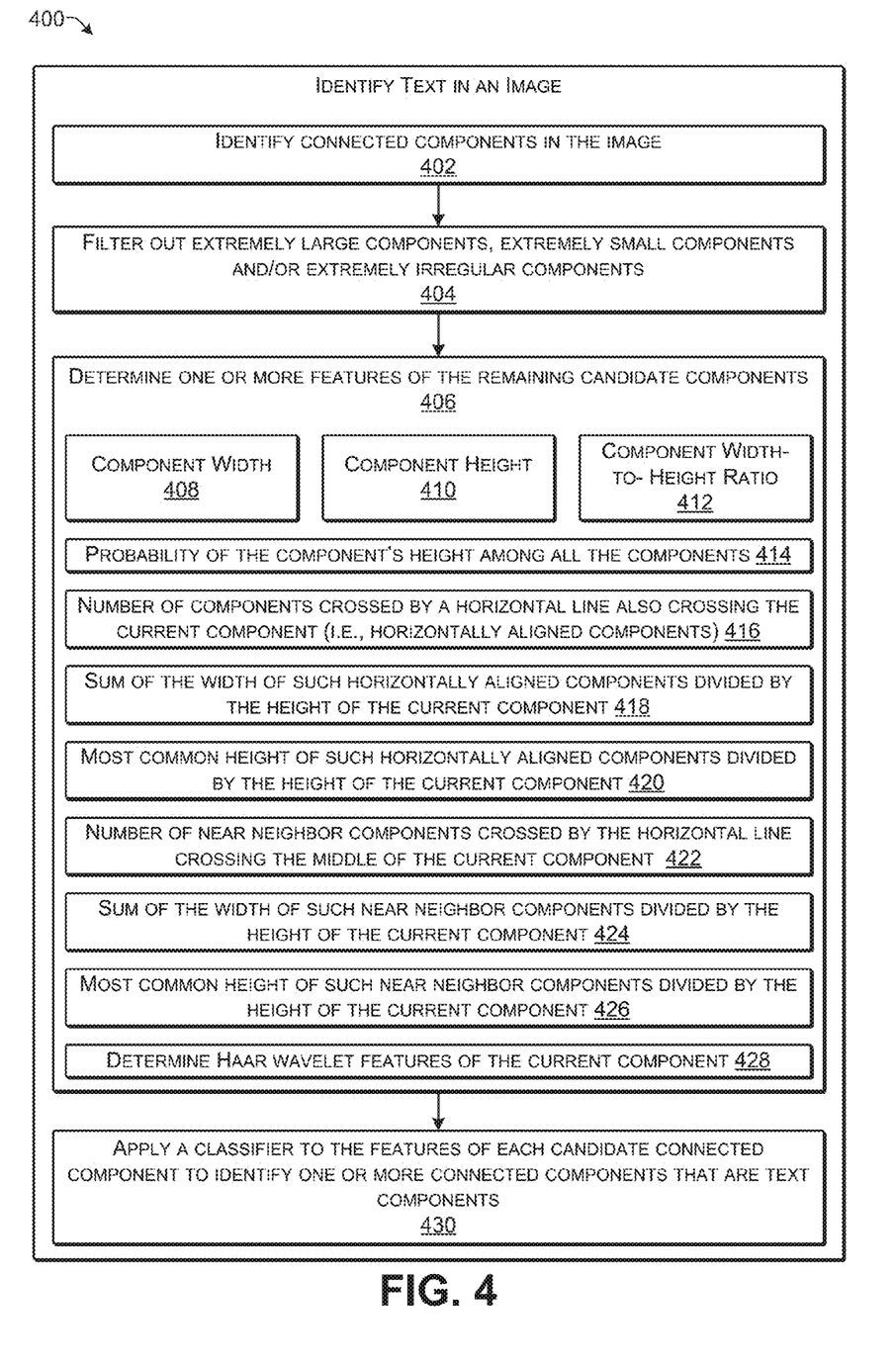
FIG. 4 is a flow diagram illustrating an example process to identify text in an image according to some implementations.

FIG. 4 is a flow diagram illustrating an example process 400 to identify text in an image according to some implementations. The process of FIG. 4 (as well as the other processes described herein) is illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

The process of FIG. 4 is just one possible example of a technique for identifying text in an image. Accordingly, implementations herein are not limited to the specific examples shown and described. In some examples, the process 400 of FIG. 4 may be executed by one or more computing devices, such as one or more computing devices of a content item provider, or other entity, executing the image assessment module 330 or other suitable computer code. In the illustrated example, the process 400 may generally include two portions, namely, a connected component analysis portion, in which connected components of the image are identified, and a classifying portion, in which the identified components are classified as either text components or nontext components. Furthermore, it may be noted that recognizing text in some situations herein may be considerably more difficult than applying conventional optical character recognition techniques because the text may be nearly illegible in some images, and therefore not easily recognized as text.

At 402, the computing device may apply connected component analysis (or labeling) to identify connected components in an image being assessed. For example, as discussed above with respect to FIG. 2, connected component analysis may be applied to identify a plurality of connected components contained within the image.

At 404, the computing device may filter out extremely large components, extremely small components, and/or extremely irregular components. For example, extremely large, small or irregular components are unlikely to be text and therefore may be eliminated from further consideration.

At 406, the computing device determines or generates one or more features of the remaining candidate components identified in the image. For example, the computing device may determine features such as component width 408, component height 410, component width-to-height ratio 412, and the probability of the component's height among all the components 414. For example, portions of text typically have a height that is somewhat uniform with that of adjacent portions of text. Accordingly, if there are a plurality of components that have a uniform height from among all the components in the image, those components might be more likely to be text.

Additional features may include determining a number of components crossed by an imaginary horizontal line that also crosses through the middle of the current component (i.e., thereby determining components that are horizontally aligned with one another). For example, text tends to be laid out in generally uniform line patterns, with a space between adjacent lines of text. Thus, identifying components that are horizontally aligned with one another tends to indicate that those components may be text components. As an example, based on an imaginary horizontal line passing through the middle of a current component and by determining whether the horizontal line crosses through any other components, some implementations may identify horizontally aligned components. Furthermore, as indicated at 418, the sum of the width of such horizontally aligned components divided by the height of the current component may further indicate textual content. Similarly, as indicated at 420, determining the most common height of such horizontally align components divided by the height of the current component may also be an indicator of textual content.

Furthermore, as indicated at 422, determining a number of near neighbor components that are crossed by the horizontal line passing through the middle of the current component may also indicate textual content, as characters of text tend to be located adjacent to one another. For instance, near neighbors may include components of which the horizontal distance (e.g., difference in x-axis direction) to the current component is less than four times the height of the current component. Additionally, as indicated at 424, the features may include determining the sum of the width of such new neighbor components divided by the height of the current component, and as indicated at 426, the features may further include the most common height of such new neighbor components divided by the height of the current component. For example, components of text tend to be generally the same height as compared with the numerous other components in image that are not text.

Furthermore, in some implementations, at 428, the computing device may determine Haar wavelet coefficients of each component. As one example, prior to computing Haar wavelet coefficients for a particular component, the region of the connected component may be scaled (e.g., the width may be 4 times the height, and the height may be the height of the component) to 16 by 16 for generating 256 Haar wavelet coefficients for the particular component. Thus, Haar wavelet coefficients may be calculated based on one or more pixel properties, such as intensity, color or texture for pixels in a selected component, and compared with adjacent regions for determining properties of the selected component.

At 430, following the determination and/or generation of one or more of the features 408-428 discussed above, a classifier may be applied to the features of each candidate component to identify one or more components of the image that are text components. For example, the text identification classifier 332 may be applied by the image assessment module 330 for discriminating text components from nontext components in the image. As one example, the classifier may be a random forest classifier previously trained on one or more of the features 408-428 using training data including a plurality of images having text content contained therein. For instance, a random forest classifier is an ensemble classifier that consists of a large number of decision trees and that outputs a class that is the mode of the classes output by individual trees. Accordingly, a decision as to whether a particular component is text or nontext may be determined based upon a terminal node in a tree at which the component ends up, i.e., the component is assigned a label of the training sample in the terminal node at which the component arrives. The procedure is iterated over all the trees in the ensemble, and the mode vote of all the trees is reported as the random forest prediction for the particular component.

In addition, the text identification classifier 332 is not limited to recognizing text in English, but may recognize text, characters, symbols, etc., in any language for which the text identification classifier 332 is trained. Accordingly, the text identification classifier 332 may identify a variety of textual characters in an image in any of a plurality of languages, and regardless of the language or writing system used in an image. Furthermore, while a random forest classifier is described as an example of a decision tree classifier that may be used according to some implementations herein, numerous other types of classifiers, such as logistic regression classifiers, support vector machines, quadratic classifiers, linear classifiers, kernel estimation classifiers, neural networks, Bayesian networks, hidden Markov models, etc., may alternatively be used, as will be apparent to those of skill in the art in light of the disclosure herein. Accordingly, this disclosure is not limited to the particular classifiers described in the examples herein. For example, the classifiers 332, 334, 336, or other classifiers described herein, may be any combination of algorithms, learning models, statistical models, feature vectors, and so forth, that receive one or more inputs, and categorize, group, cluster, organize, or otherwise classify the one or more inputs into one or more sets, categories, groups, clusters, or the like, such as based on one or more quantifiable properties or features of the one or more inputs.

Figure 5:
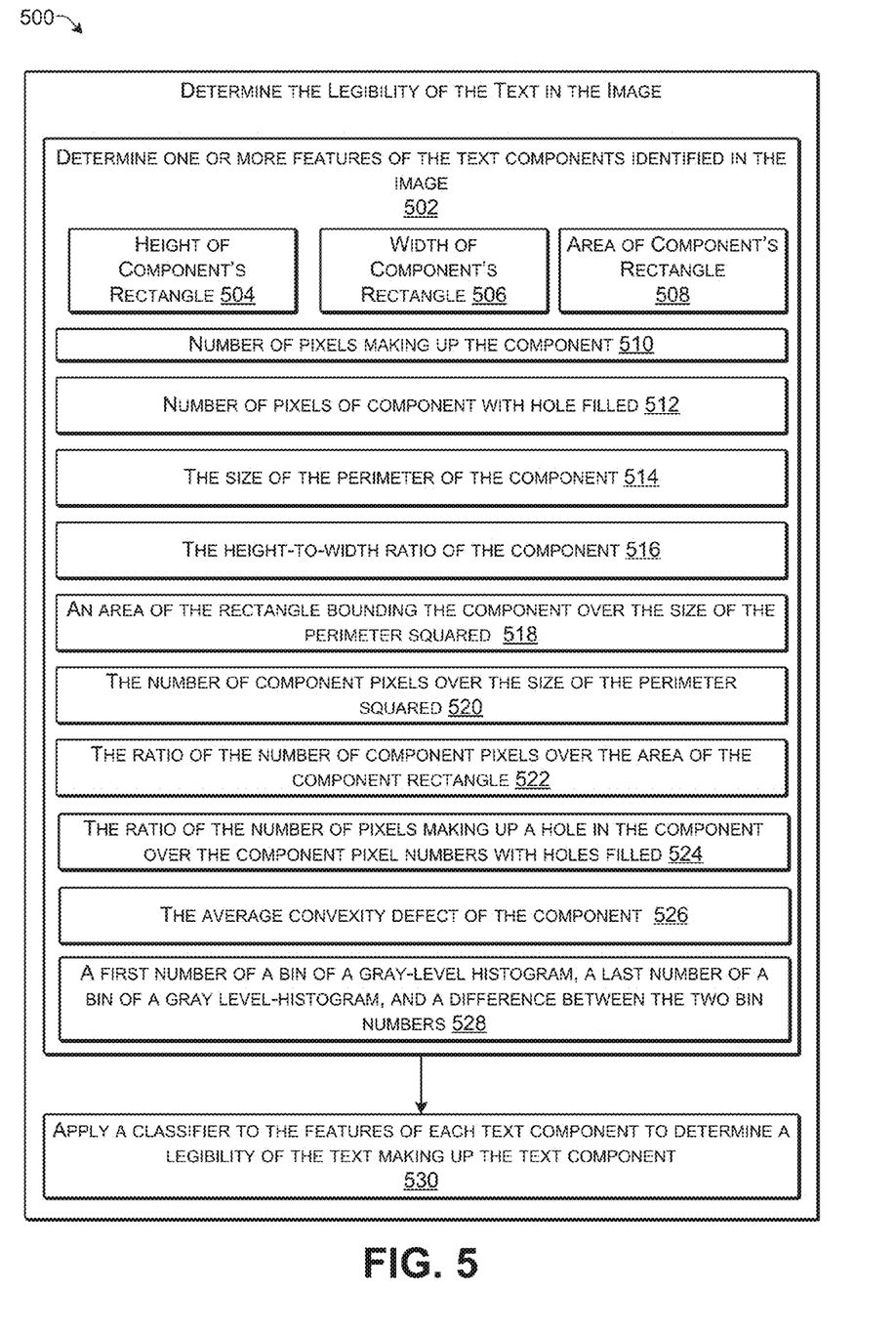
FIG. 5 is a flow diagram illustrating an example process to determine legibility of the text in an image according to some implementations.

FIG. 5 is a flow diagram illustrating an example process 500 to determine legibility of text in an image according to some implementations. The process 500 may be performed by a computing device, such as one or more computing devices of a content item provider, or other entity, executing the image assessment module 330 or other suitable computer code.

At 502, the computing device determines one or more features of the text identified in the image. As one example, the computing device may take the output of the example process 400 discussed above and may determine one or more features of any text components identified in the image during the execution of the process 400. Examples of features that may be considered for determining legibility of the identified text components may include the height of the text component's rectangle 504 (i.e., a bounding rectangle), the width of the text component's rectangle 506, and/or the area of the component's rectangle 508. For example, a bounding rectangle may be established around the component and the size of the rectangle may be determined. Furthermore, other features that may be taken into consideration include, at 510, a number of pixels making up the component; and at 512, a number of pixels of the component with a hole filled. For instance, text that is too small may be deemed to be illegible. As one example of a suitable threshold, any text that is five pixels or smaller in height may be deemed to be illegible. However, implementations are not limited to this particular threshold and may take into consideration other features and factors. For example, if a component has an opening or hole in a portion of the component, as is the case with many alphanumeric characters, the number of pixels making up the opening or hole may be considered at 512 when determining the overall number of pixels in the component.

Additional features that may be considered include, at 514, length of a perimeter of the component; at 516 a height-to-width ratio of the component; at 518, an area of the rectangle of the component divided by the perimeter squared; at 520, the number of pixels in the component divided by the perimeter squared; at 522, the ratio of the number of component pixels to the area of the component rectangle; at 524, the ratio of the number of pixels making up a hole in the component to the number of pixels in the component with holes filled; and at 526, the average convexity defect of the component.

Furthermore, in some implementations, additional features that may be considered, as indicated at 528 include a first number of a bin of a gray-level histogram, a last number of a bin of the gray-level histogram, and a difference between the two bin numbers. For example, with respect to monotone images, gray-level grouping may employ histograms for determining various groupings of pixels of a component. For example, the pixels of the component may be grouped into bins along a grayscale, resulting in a histogram. The locations of the first and last bins in the gray-level histogram generated from the pixels of the component may indicate a sharpness of the component, such as a sharpness or legibility of an alphanumeric character that makes up the component. Furthermore, with respect to color images, as one example, the image may be converted to grayscale to determine the gray-level groupings as discussed above. Alternatively, multiband thresholding may be employed in a similar manner to that described above, such as by separating the image into RGB elements to obtain multiple histograms, and then combining the bins of the multiple histograms to determine a result. Numerous other types of thresholding and other variations will be apparent to those of skill in the art in light of the disclosure herein, with the foregoing, merely being several examples.

At 530, the computing device may apply a classifier to one or more of the features of each component to determine a legibility of the text making up the component. For example, the text legibility classifier 334 may be applied by the image assessment module 330 for assessing the legibility of text components identified in the image. In some cases, a confidence level may be applied to each text component for designating whether the particular component is illegible or not. For example, the confidence level may be between "0" and "1," where "0" represents an illegible component and "1" represents a legible component (although any other suitable scales or ranges may be used). Furthermore, a human ground truth may be used to establish a text legibility threshold, which may be assigned a number between "0" and "1." For example, the human ground truth may be based on the training data used to train the text legibility classifier 334. Thus, one or more humans may view the training data and provide their own assessment as to whether the text contained in the training data is legible or not. Accordingly, the text legibility threshold may be determined from the training data based on this human ground truth, and then applied to the runtime data for providing an assessment of legibility of each component in the image. For example, if the confidence level for a particular text component is below the text legibility threshold, the text component may be considered illegible, while if the confidence level is greater than or equal to the text legibility threshold, the text component may be considered legible.

As one example, the text legibility classifier 334 may be a random forest classifier previously trained on at least some of the features 504-528 using training data including a plurality of images including text content therein. The random forest classifier in this process 500 may operate in a manner similar to that described above with respect to the classifier in the process 400 of FIG. 4. Furthermore, while a random forest classifier is described as an example of a suitable classifier that may be used according to some implementations herein, numerous other types of classifiers, such as logistic regression classifiers, support vector machines, quadratic classifiers, etc., may alternatively be used, as will be apparent to those of skill in the art in light of the disclosure herein. Accordingly, this disclosure is not limited to the particular classifiers described in the examples herein.

Figure 6:
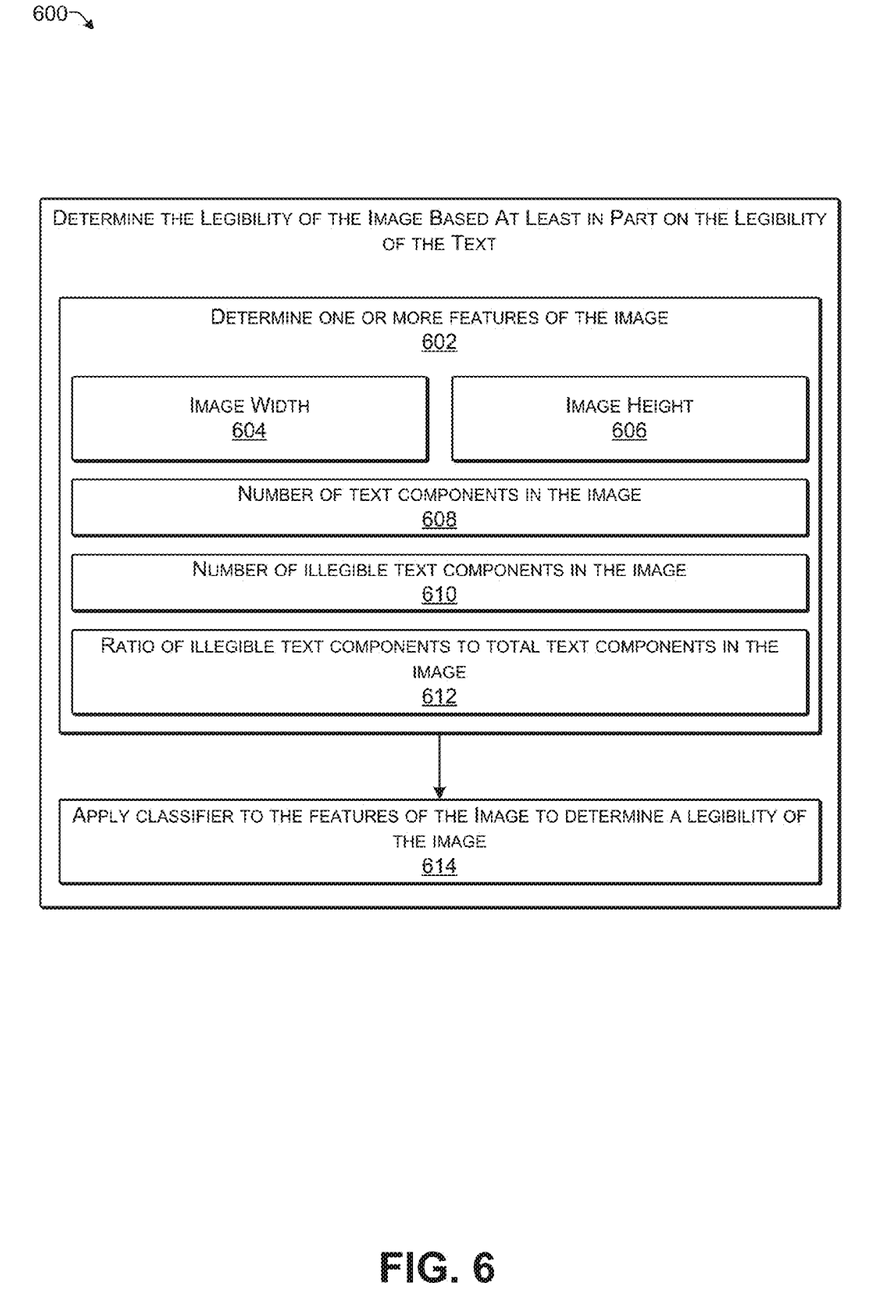
FIG. 6 is a flow diagram illustrating an example process to assess the legibility of an image based at least in part on the legibility of the text in the image according to some implementations.

FIG. 6 is a flow diagram illustrating an example process 600 for assessing the overall legibility of an image based at least in part on the legibility of the text according to some implementations. The process 600 may be performed by a computing device, such as one or more computing devices of a content item provider, or other entity, executing the image assessment module 330 or other suitable computer code.

At 602, the computing device determines one or more features of the image. For example, the features may include an image width 604 and an image height 606. The features may further include, at 608, a total number of text components in the image; at 610, the number of illegible text components in the image; and at 612, a ratio of the illegible text components to the total text components in the image.

At 614, the computing device applies a classifier to the features of the image to determine the legibility of the image. For example, the image legibility classifier 336 may be applied by the image assessment module 330 for determining the legibility of the image. In some cases, a confidence level may be applied to the image for designating whether the particular image is legible or illegible. For example, the confidence level may be between "0" and "1," where "0" represents an illegible component and "1" represents a legible component (although any other suitable scales or ranges may be used). Furthermore, a human ground truth may be established as a threshold for legibility of the image and may be assigned a number between "0" and "1." For example, the human ground truth may be established based on the training data used to train the image legibility classifier 336. Thus, one or more humans may view the training data and provide their own assessment as to whether the image in the training data is legible or not. Accordingly, the image legibility threshold may be determined from the training data based on this human ground truth, and then applied to the runtime data for providing an assessment of legibility of each component in the image. For example, if the confidence level for the image is below the image legibility threshold, the image may be considered illegible, while if the confidence level is greater than or equal to the image legibility threshold, the image may be considered legible.

In some examples, the image legibility classifier 336 may be a random forest classifier previously trained on the features 604-612 using training data including a plurality of images containing text content therein. The random forest classifier in this process 600 may operate in a manner similar to that described above with respect to the process 400 of FIG. 4. Furthermore, while a random forest classifier is described as an example of a classifier that may be used according to some implementations herein, numerous other types of classifiers, such as logistic regression classifiers, support vector machines, quadratic classifiers, etc., may alternatively be used, as will be apparent to those of skill in the art in light of the disclosure herein. Accordingly, this disclosure is not limited to the particular classifiers described in the examples herein.

Additionally, the example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Example Computing Device(s)

Figure 7:
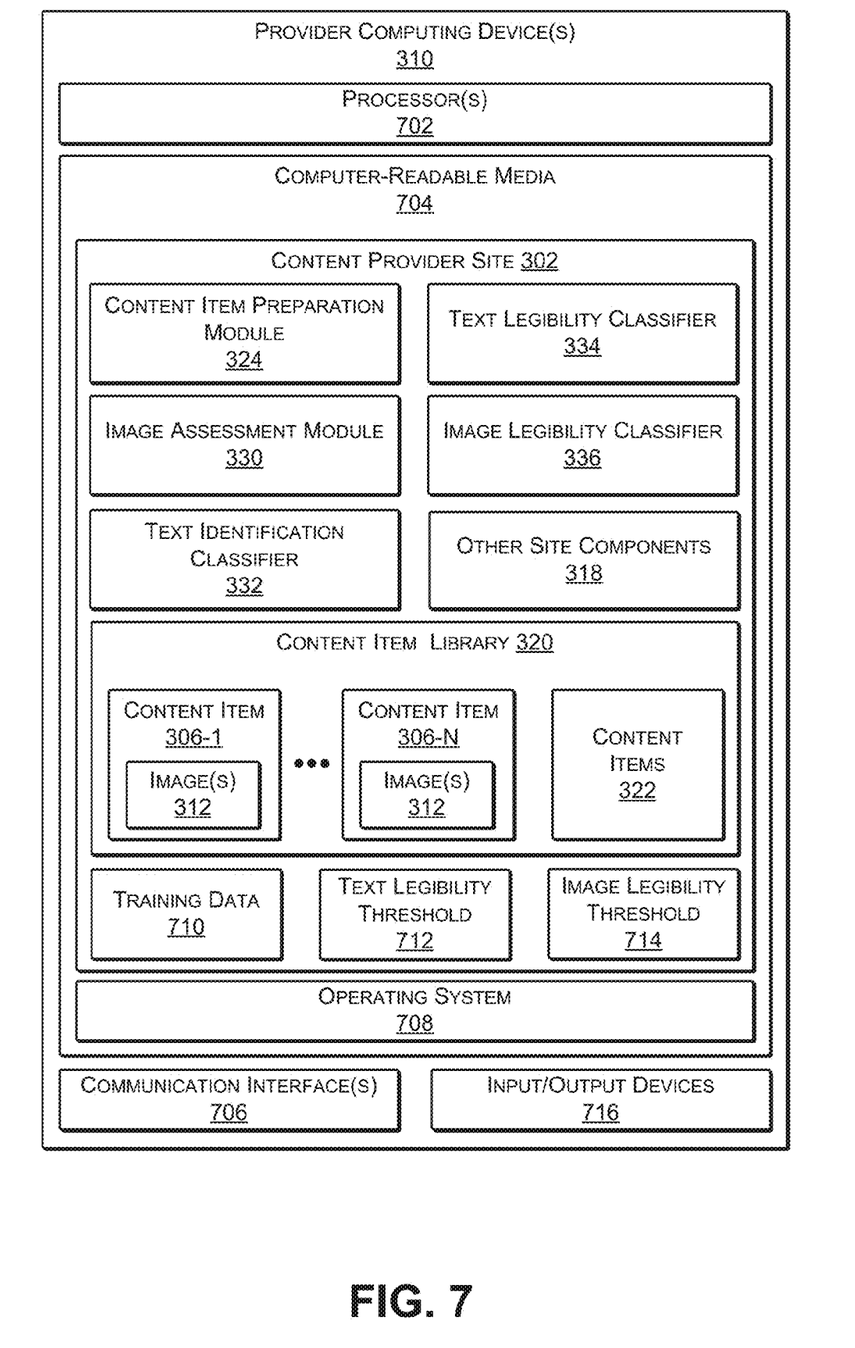
FIG. 7 illustrates select components of one or more example computing devices of a content item provider according to some implementations.

FIG. 7 illustrates select components of one or more provider computing devices 310 that may be used to implement the functionality of the content provider site 302 according to some implementations. The content provider site 302 may be hosted on one or more servers or other types of computing devices that may be embodied in any number of ways. For instance, in the case of a server, the content provider site 302 may be implemented on a single server, a cluster of servers, a server farm or data center, a cloud hosted computing service, and so forth, although other computer architectures (e.g., a mainframe architecture) may also be used. Further, while the figures illustrate the components of the content provider site 302 as being present in a single location, it is to be appreciated that these components may be distributed across different computing devices and locations in any manner. Generally, the content provider site 302 may be implemented by one or more computing devices, with the various functionality described above distributed in various ways across the different computing devices. The computing devices may be located together or separately, and organized, for example, as virtual servers, server banks and/or server farms. The described functionality may be provided by the servers of a single entity or enterprise, or may be provided by the servers and/or services of multiple entities or enterprises.

As illustrated in FIG. 7, an example provider computing device 310 includes one or more processors 702, a computer-readable media 704, and one or more communication interfaces 706. The processor(s) 702 may be a single processing unit or a number of processing units, and may include single or multiple computing units or multiple cores. The processor(s) 702 can be configured to fetch and execute computer-readable instructions stored in the computer-readable media 704 or other computer-readable media. In some examples, the provider computing device 310 corresponds to the computing device 104 of FIG. 1.

The computer-readable media 704 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device 310, the computer-readable media 704 may be a type of computer-readable storage media and may be a non-transitory storage media.

The computer-readable media 704 may be used to store any number of functional components that are executable by the processors 702. In many implementations, these functional components comprise instructions or programs that are executable by the processors 702 and that, when executed, implement operational logic for performing the actions attributed above to the content provider site 302 and/or the computing device(s) 310. Functional components of the content provider site 302 that may be executed on the processors 702 for implementing the various functions and features related to assessing legibility of images, as described herein, include the content item preparation module 324, the image assessment module 330, the text identification classifier 332, the text legibility classifier 334, and the image legibility classifier 336. Additional functional components stored in the computer-readable media 704 may include the other site components 318, and an operating system 708 for controlling and managing various functions of the provider computing device(s) 310.

In addition, the computer-readable media 704 may include, or the provider computing device(s) 310 may access, data, which may include the content item library 320, including the content items 306, 322; training data 710 used to train the classifiers 332, 334, 336; a text legibility threshold 712 used to establish the threshold for legibility of the text components; and an image legibility threshold 714 used to establish legibility of the image. In addition, the provider computing device(s) 310 may include many other logical, programmatic and physical components, of which those described above are merely examples that are related to the discussion herein.

The communication interface(s) 706 may include one or more interfaces and hardware components for enabling communication with various other devices, such as the electronic devices 308, over the network(s) 316. For example, communication interface(s) 706 may facilitate communication through one or more of the Internet, cable networks, cellular networks, wireless networks (e.g., Wi-Fi, cellular) and wired networks. Various different approaches to implementations described herein can be implemented in various environments. For instance, the network(s) 316 may include any appropriate network, including an intranet, the Internet, a cellular network, a LAN, WAN, VPN or any other network or combination thereof. Components used for such a system can depend at least in part upon the type of network and/or environment selected. Protocols and components for communicating via such networks are well known and will not be discussed herein in detail.

Provider computing device(s) 310 may further be equipped with various input/output devices 716. Such I/O devices 716 may include a display, various user interface controls (e.g., buttons, mouse, keyboard, touch screen, etc.), audio speakers, connection ports and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A method comprising:
receiving a content item containing an image, the image including text;
performing connected component analysis on the image to identify connected components of the image based at least in part on comparing a value of a pixel property for a particular pixel with a value of the pixel property for a neighboring pixel;
classifying individual ones of the connected components of the image as text components or non-text components based at least on a text identification classifier;
training a legibility classifier using one or more images of training data;
determining a legibility threshold based at least in part on a determined legibility of the one or more images of the training data;
determining a legibility of the individual ones of the text components by:
    generating, using the legibility classifier, a confidence level for the legibility of an individual text component based at least in part on one or more features of the individual text component in the image; and
    comparing the confidence level with the legibility threshold;
classifying, based at least in part on the determining of the legibility of the individual ones of the text components, the image as illegible; and
sending a message indicating that the image is illegible.

2. The method as recited in claim 1, wherein classifying the identified connected components of the image as text components or non-text components further comprises determining at least one of:
a width of a connected component;
height of a connected component;
width-to-height ratio of a connected component; or
a comparison of a height of the connected component with a height of at least one other connected component.

3. The method as recited in claim 1, wherein classifying the identified connected components of the image as text components or non-text components further comprises determining at least one of:
a number of the connected components that are horizontally aligned with one another;
a sum of a width of the horizontally aligned connected components divided by a height of a current connected component;
a most-common height of the horizontally aligned connected components divided by the height of the current connected component;
a number of near-neighbor connected components horizontally aligned with the current connected component, wherein a horizontal distance to a near neighbor connected component is less than a threshold height of the current connected component;
a sum of a width of the near-neighbor connected components divided by the height of the current connected component; or
a most-common height of the near-neighbor connected components divided by the height of the current connected component.

4. The method as recited in claim 1, wherein classifying the connected components of the image as text components or non-text components further comprises determining Haar wavelet coefficients of at least one connected component.

5. The method as recited in claim 1, wherein determining the legibility of the individual ones of the text components further comprises determining at least one of:
a height of a rectangle bounding at least one of the text components;
a width of the rectangle bounding at least one of the text components; or
an area of the rectangle bounding at least one of the text components.

6. The method as recited in claim 1, wherein determining a legibility of the one or more text components identified in the image further comprises determining, for each text component, at least one of:
a number of pixels of the text component;
a number of pixels of the text component with a hole filled;
a length of a perimeter of the text component;
a height-to-width ratio of the text component;
an area of a rectangle bounding the text component divided by the length of the perimeter squared;
the number of pixels in the text component divided by a number of pixels in the length of the perimeter squared;
a ratio of the number of pixels in the text component to the area of the rectangle bounding the text component;
a ratio of a number of hole pixels in the text component to a total number of pixels in the text component with holes filled; or
an average convexity defect of the text component.

7. The method as recited in claim 1, wherein determining the legibility of the individual ones of the text components further comprises generating a gray-level histogram associated with the image and determining at least one of:

a first number of a bin of the gray-level histogram;
a last number of a bin of the gray level histogram; or
a difference between the first bin number and the last bin number.

8. The method as recited in claim 1, wherein classifying the image as illegible further comprises determining at least one of:
an image width;
an image height;
a total number of text components in the image;
a number of text components in the image determined to be illegible; or
a ratio of illegible text components to the total number of text components in the image.

9. The method as recited in claim 1, further comprising using the legibility classifier for performing classifying the image as illegible.

10. The method as recited in claim 9, wherein the legibility classifier is a random forest classifier.

11. The method as recited in claim 1, further comprising downsizing the image from a first size to a smaller second size based, at least in part, on at least one form factor of an electronic device.

12. The method as recited in claim 1, further comprising providing the image to a computing device of a human reviewer to verify the classification of the image as either legible or illegible.

13. The method as recited in claim 1, further comprising removing the content item from a library that is available to one or more users.

14. A system comprising:
one or more processors;
one or more computer-readable media; and
one or more modules maintained on the one or more computer-readable media to be executed by the one or more processors to perform operations including:
receiving a content item that includes an image;
identifying one or more text components in the image;
determining a legibility of individual ones of the text components by:
generating a confidence level for the legibility of an individual text component based at least in part on a number of pixels that form the individual text component in the image; and
comparing the confidence level with a legibility threshold, the legibility threshold based at least in part on a determined legibility of one or more images of training data used to train a classifier;
classifying, based at least on the determining the legibility of the individual ones of the text components, the image as illegible; and
sending a message indicating that the image has been determined to be illegible.

15. The system as recited in claim 14, wherein the one or more processors further perform an operation of flagging the image for review by a human.

16. The system as recited in claim 14, wherein the operation of identifying one or more text components in the image further comprises:
performing connected component analysis on the image to identify connected components in the image based at least on comparing a value of a pixel property for a particular pixel with a value of the pixel property for a neighboring pixel; and
classifying each connected component as either a text component or a non-text component based, at least in part, on a comparison of one or more features of a first connected component with one or more features of others of the connected components.

17. The system as recited in claim 14, wherein the image has been downsized from a first size to a smaller second size based at least in part on at least one form factor of an electronic device.

18. The system as recited in claim 14, wherein the one or more processors further performs an operation of providing the image to a computing device of a human reviewer to verify the classification of the image as either legible or illegible.

19. The system as recited in claim 14, wherein determining the legibility of the individual ones of the text components further comprises generating a gray-level histogram associated with the image and determining at least one of:
a first number of a bin of the gray-level histogram;
a last number of a bin of the gray level histogram; or
a difference between the first bin number and the last bin number.

20. The system as recited in claim 14, wherein identifying one or more text components in the image further comprises determining Haar wavelet coefficients of at least one text component.

21. One or more non-transitory computer-readable media maintaining instructions executable by one or more processors to perform operations comprising:
obtaining an image including text;
identifying one or more text components in the image by analyzing pixels of the image to identify neighboring pixels that share at least one pixel property within a threshold range of values for the at least one pixel property;
determining a legibility of individual ones of the identified text components by:
generating a gray-level histogram based at least in part on the individual text component; and
generating a confidence level for the legibility of an individual text component based at least in part on at least one of a first number of a bin of the gray-level histogram, a last number of a bin of the gray level histogram; or a difference between the first bin number and the last bin number; and
comparing the confidence level with a legibility threshold, the legibility threshold based at least in part on a determined legibility of one or more images of training data used to train a classifier;
classifying, based at least on the determining the legibility of the individual ones of the text components, the image as illegible; and
sending a message indicating that the image has been determined to be illegible.

22. The one or more non-transitory computer-readable media of claim 21, wherein the identifying one or more text components in the image further comprises:
determining at least one of:
a component width;
a component height;
a component width-to-height ratio; or
a comparison of a height of a component with a height of at least one other component.

23. The one or more non-transitory computer-readable media of claim 21, wherein the identifying one or more text components in the image further comprises:
determining at least one of:
a number of components horizontally aligned with one another;

- a sum of a width of the horizontally aligned components divided by a height of a current component;
- a most-common height of the horizontally aligned components divided by the height of the current component;
- a number of near-neighbor components horizontally aligned with the current component, wherein a horizontal distance to a near neighbor component is less than a threshold height of the current component;
- a sum of a width of the near-neighbor components divided by the height of the current component; or
- a most-common height of the near-neighbor components divided by the height of the current component.

24. The one or more non-transitory computer-readable media of claim 21, wherein the identifying one or more text components in the image further comprises determining Haar wavelet coefficients of at least one component.

25. The one or more non-transitory computer-readable media of claim 21, wherein the operations further comprise providing the image to a computing device of a human reviewer to verify the classification of the image as either legible or illegible.

26. The one or more non-transitory computer-readable media of claim 21, wherein the image has been downsized from a first size to a smaller second size based, at least in part, on at least one form factor of an electronic device.

27. The one or more non-transitory computer-readable media of claim 21, wherein the operations further comprise removing the content item from a library that is available to one or more users.

* * * * *